US009528445B2

(12) United States Patent
Zeng et al.

(10) Patent No.: US 9,528,445 B2
(45) Date of Patent: Dec. 27, 2016

(54) SYSTEM AND METHOD FOR MODEL BASED AND MAP BASED THROTTLE POSITION DERIVATION AND MONITORING (71) Applicant: General Electric Company, Schenectady, NY (US)

(72) Inventors: Pin Zeng, Oconomowoc, WI (US); Daniel M. Lamberson, Bolingbrook, IL (US)

(73) Assignee: General Electric Company, Schenectady, NY (US)

( * ) Notice: Subject to any disclaimer, the term of this patent is extended or adjusted under 35 U.S.C. 154(b) by 135 days.

(21) Appl. No.: 14/614,237

(22) Filed: Feb. 4, 2015

(65) Prior Publication Data
US 2016/0222891 A1 Aug. 4, 2016

(51) Int. Cl.
*F02D 9/08* (2006.01)
*F02D 41/14* (2006.01)
(Continued)

(52) U.S. Cl.
CPC . *F02D 9/08* (2013.01); *F02D 9/02* (2013.01); *F02D 9/105* (2013.01);
(Continued)

(58) Field of Classification Search
CPC ............. F02D 9/00; F02D 9/02; F02D 9/105; F02D 9/08; F02D 41/0002
(Continued)

(56) References Cited

U.S. PATENT DOCUMENTS 5,029,565 A 7/1991 Talbot
5,079,946 A * 1/1992 Motamedi ............... F02B 77/08
73/114.36
(Continued)

FOREIGN PATENT DOCUMENTS

CN 203480037 3/2014
EP 1447654 8/2004
(Continued)

OTHER PUBLICATIONS

U.S. Appl. No. 14/617,458, filed Feb. 9, 2015, Jeffrey Jacob Bizub.
(Continued)

*Primary Examiner* — Mahmoud Gimie
(74) *Attorney, Agent, or Firm* — Fletcher Yoder, P.C.

(57) ABSTRACT

In one embodiment, an engine system may include an engine control system configured to receive a first pressure signal transmitted from a first pressure sensor disposed downstream from a throttle valve, receive a first temperature signal transmitted from a first temperature sensor disposed downstream from the throttle valve, derive a first pressure representative of the first pressure signal, derive a first temperature representative of the first temperature signal, derive a desired air-fuel mixture flow through the throttle valve, derive a first throttle position using a model, wherein the model is configured to use the desired air-fuel mixture flow, the first pressure, and the first temperature as model input, derive a second throttle position using a map, compare the first and second throttle positions, and apply the first throttle position to control the throttle valve when the first and second throttle positions are within one or more calibrated thresholds.

20 Claims, 4 Drawing Sheets (51) Int. Cl.
*F02D 9/10* (2006.01)
*F02D 9/02* (2006.01)
*F02D 35/00* (2006.01)
*F02D 41/00* (2006.01)
*F02D 9/00* (2006.01)

(52) U.S. Cl.
CPC ..... *F02D 35/0053* (2013.01); *F02D 41/0002* (2013.01); *F02D 41/1401* (2013.01); *F02D 9/00* (2013.01); *F02D 2041/1433* (2013.01); *F02D 2041/1434* (2013.01); *F02D 2041/1437* (2013.01); *F02D 2200/0402* (2013.01); *F02D 2200/0404* (2013.01); *F02D 2200/0406* (2013.01); *F02D 2200/0414* (2013.01)

(58) Field of Classification Search
USPC ......... 701/103, 102, 114; 123/399, 402, 403
See application file for complete search history.

(56) References Cited

U.S. PATENT DOCUMENTS

| | | | |
|---|---|---|---|
| 5,111,790 A | 5/1992 | Grandy | |
| 5,115,778 A | 5/1992 | Holroyd | |
| 5,119,783 A | 6/1992 | Komurasski | |
| 5,241,480 A | 8/1993 | Takaku et al. | |
| 5,257,533 A | 11/1993 | Imada | |
| 5,337,240 A | 8/1994 | Nakagawa et al. | |
| 5,339,245 A | 8/1994 | Hirata et al. | |
| 5,361,213 A | 11/1994 | Fujieda et al. | |
| 5,392,642 A | 2/1995 | Tao | |
| 5,400,648 A | 3/1995 | Mahr | |
| 5,452,699 A | 9/1995 | Rossignol | |
| 5,467,638 A | 11/1995 | Philipp | |
| 5,594,649 A | 1/1997 | Cook et al. | |
| 5,693,936 A | 12/1997 | Komachiya et al. | |
| 5,763,769 A | 6/1998 | Kluzner | |
| 5,837,887 A | 11/1998 | Shibata et al. | |
| 5,905,193 A | 5/1999 | Hashizume et al. | |
| 5,932,801 A | 8/1999 | Akishita et al. | |
| 5,934,256 A | 8/1999 | Wenzlawski et al. | |
| 5,996,398 A | 12/1999 | Schleupen et al. | |
| 6,104,195 A | 8/2000 | Yoshinaga et al. | |
| 6,273,064 B1 | 8/2001 | Scholl et al. | |
| 6,276,334 B1 | 8/2001 | Flynn et al. | |
| 6,330,877 B1 | 12/2001 | Nordin | |
| 6,336,355 B1 | 1/2002 | Sasaki et al. | |
| 6,550,311 B2 | 4/2003 | Sloboda | |
| 6,598,468 B2 | 7/2003 | Zur Loye et al. | |
| 6,662,781 B1 | 12/2003 | Torno et al. | |
| 6,814,054 B2 | 11/2004 | Sauler et al. | |
| 6,862,517 B2 | 3/2005 | Galtier | |
| 6,885,932 B2 | 4/2005 | Liu et al. | |
| 6,912,460 B2 | 6/2005 | Sauler et al. | |
| 6,947,829 B2 | 9/2005 | Honda | |
| 6,978,771 B2 | 12/2005 | Kuzuyama et al. | |
| 6,983,738 B2* | 1/2006 | Nakamura | F02D 9/10 123/492 |
| 6,990,947 B2 | 1/2006 | Kuzuyama et al. | |
| 7,021,128 B2 | 4/2006 | Rauchfuss et al. | |
| 7,027,909 B2 | 4/2006 | deBotton et al. | |
| 7,051,726 B1* | 5/2006 | Muto | F02D 11/105 123/399 |
| 7,181,338 B2 | 2/2007 | Takemura et al. | |
| 7,191,658 B2 | 3/2007 | Oda et al. | |
| 7,212,909 B2 | 5/2007 | Yoshino et al. | |
| 7,243,529 B2 | 7/2007 | Takemura et al. | |
| 7,246,600 B2 | 7/2007 | Nakashima et al. | |
| 7,260,469 B2 | 8/2007 | Birk et al. | |
| 7,263,872 B2 | 9/2007 | Danet et al. | |
| 7,266,442 B2* | 9/2007 | Ting | F02D 41/0002 701/114 |
| 7,310,993 B2 | 12/2007 | Popielas et al. | |
| 7,325,529 B2 | 2/2008 | Ancimer et al. | |
| 7,356,404 B2 | 4/2008 | Takemura et al. | |
| 7,376,506 B2 | 5/2008 | Schueler | |
| 7,383,816 B2 | 6/2008 | Zurlo | |
| 7,444,231 B2 | 10/2008 | Ancimer et al. | |
| 7,444,236 B2 | 10/2008 | Wiles | |
| 7,448,254 B2 | 11/2008 | Kurtz et al. | |
| 7,546,198 B2 | 6/2009 | Remelman | |
| 7,559,230 B2 | 7/2009 | Zimmer | |
| 7,571,640 B2 | 8/2009 | Andrews | |
| 7,628,253 B2 | 12/2009 | Jin et al. | |
| 7,669,582 B2 | 3/2010 | Huang | |
| 7,712,450 B2 | 5/2010 | Sato et al. | |
| 7,747,380 B2 | 6/2010 | Chauvin et al. | |
| 7,810,469 B2 | 10/2010 | Vigild et al. | |
| 7,823,561 B2 | 11/2010 | Omuro et al. | |
| 8,000,884 B2 | 8/2011 | Aso et al. | |
| 8,032,293 B2 | 10/2011 | Binder et al. | |
| 8,068,972 B2 | 11/2011 | Auclair et al. | |
| 8,078,389 B2 | 12/2011 | Huang et al. | |
| 8,079,261 B2 | 12/2011 | Crickmore et al. | |
| 8,108,131 B2 | 1/2012 | Huang et al. | |
| 8,155,857 B2 | 4/2012 | Loeffler et al. | |
| 8,250,905 B2 | 8/2012 | Schneider et al. | |
| 8,260,531 B2 | 9/2012 | Yasuda | |
| 8,316,824 B2 | 11/2012 | Hagari et al. | |
| 8,342,011 B2 | 1/2013 | Galtier et al. | |
| 8,359,909 B2 | 1/2013 | Duval et al. | |
| 8,396,649 B2 | 3/2013 | Huang | |
| 8,463,533 B2 | 6/2013 | Glugla et al. | |
| 8,499,623 B2 | 8/2013 | Duval et al. | |
| 8,528,521 B2 | 9/2013 | Landsmann et al. | |
| 8,538,666 B2 | 9/2013 | Buslepp et al. | |
| 8,606,484 B2 | 12/2013 | Ohata | |
| 8,627,800 B2 | 1/2014 | Glugla et al. | |
| 8,639,432 B2 | 1/2014 | Matsuo et al. | |
| 8,677,975 B2 | 3/2014 | Auclair et al. | |
| 8,680,707 B2 | 3/2014 | Childs et al. | |
| 8,849,471 B2 | 9/2014 | Daniel et al. | |
| 2006/0112929 A1* | 6/2006 | Muto | F02D 11/105 123/350 |
| 2014/0074376 A1 | 3/2014 | Hashemi et al. | |
| 2014/0116376 A1 | 5/2014 | Hagari | |
| 2015/0144114 A1 | 5/2015 | Tanaka | |

FOREIGN PATENT DOCUMENTS

| | | |
|---|---|---|
| EP | 1657421 A2 | 5/2006 |
| EP | 1662118 A1 | 5/2006 |
| EP | 1698775 | 6/2006 |
| EP | 1840360 | 3/2007 |
| EP | 1988378 | 5/2008 |
| EP | 2128409 | 2/2009 |
| EP | 2128410 | 2/2009 |
| EP | 2433355 | 3/2012 |
| EP | 2500705 | 9/2012 |
| JP | 2002147269 A | 5/2002 |
| JP | 2002295279 A | 10/2002 |
| WO | WO2008000568 | 1/2008 |
| WO | WO2008059376 | 5/2008 |
| WO | WO2009106557 | 9/2009 |
| WO | WO2013015372 | 1/2013 |
| WO | WO2013026950 | 2/2013 |
| WO | WO2013118151 | 8/2013 |
| WO | 2013175589 A1 | 11/2013 |

OTHER PUBLICATIONS

U.S. Appl. No. 14/621,028, filed Feb. 15, 2015, Jeffrey Jacob Bizub.
U.S. Appl. No. 14/626,385, filed Feb. 19, 2015, Jeffrey Jacob Bizub.
U.S. Appl. No. 14/639,736, filed Mar. 5, 2015, Jeffrey Jacob Bizub.
U.S. Appl. No. 14/644,526, filed Mar. 11, 2015, Jeffrey Jacob Bizub.
U.S. Appl. No. 14/657,817, filed Mar. 13, 2015, Jeffrey Jacob Bizub.
U.S. Appl. No. 14/676,733, filed Apr. 1, 2015, Jeffrey Jacob Bizub.
U.S. Appl. No. 14/686,350, filed Apr. 14, 2015, Maruthi Narasinga Rao Devarakonda.
U.S. Appl. No. 14/695,335, filed Apr. 24, 2015, Jeffrey Jacob Bizub.
U.S. Appl. No. 14/705,081, filed May 6, 2015, Scott K. Mann.
U.S. Appl. No. 14/745,986, filed Jun. 22, 2015, Sandro Rivellini.

(56) References Cited

OTHER PUBLICATIONS

U.S. Appl. No. 14/754,128, filed Jun. 29, 2015, Jeffrey Jacob Bizub.
U.S. Appl. No. 14/790,785, filed Jul. 2, 2015, Pavan Chakravarthy Nandigama.
U.S. Appl. No. 14/796,934, filed Jul. 10, 2015, Jeffrey Jacob Bizub.
U.S. Appl. No. 14/820,156, filed Aug. 6, 2015, Jeffrey Jacob Bizub.
U.S. Appl. No. 14/918,013, filed Oct. 20, 2015, Venkatesh Raman.
U.S. Appl. No. 14/320,101, filed Jun. 30, 2014, Ryan Thomas Smith.
U.S. Appl. No. 14/587,407, filed Dec. 31, 2014, Jeffrey Jacob Bizub.
U.S. Appl. No. 14/587,412, filed Dec. 31, 2014, Jerry Jacob Bizub.
U.S. Appl. No. 14/587,434, filed Dec. 31, 2014, Jeffrey Jacob Bizub.
U.S. Appl. No. 14/591,192, filed Jan. 7, 2015, Jeffrey Jacob Bizub.
U.S. Appl. No. 14/592,547, filed Jan. 8, 2015, Jeffrey Jacob Bizub.
U.S. Appl. No. 14/600,674, filed Jan. 20, 2015, Scott K. Mann.
U.S. Appl. No. 14/609,416, filed Jan. 29, 2015, Jeffrey Jacob Bizub.
Reduction Piston Slap Excitation by Optimizing Piston Profiles; Takayuki Koizumi et al,; Proc. of 2002 IMAC-XX: Conf. & Exposition on Structural Dynamics, Jun. 12-15, 2000.
VE Piston Dynamics; FEV Group, Inc.; available online; www.fev.com/what-we-do/software/virtual-engine-powertrain-dynamics-simulation/piston-dynamics-module; Jan. 1, 2015.
Diagnostic Internal Combustion Engine Based on Crankshaft Angular Acceleration; Binh Le Khac, Tuma J.; available online; www.researchgate.net, May 2012.
Bolt loosening detection using vibration characteristics of thin plate with piezoelectric elements;Takeshi Nakahara et al; Proc.of SPIE 5391, Smart Struc. & Materials, Jul. 2004.
European Search Report and Opinion issued in connection with corresponding EP Application No. 16153942.4 on Jun. 22, 2016.

\* cited by examiner

SYSTEM AND METHOD FOR MODEL BASED AND MAP BASED THROTTLE POSITION DERIVATION AND MONITORING

BACKGROUND

The subject matter disclosed herein relates to controlling an engine, and, more particularly, to producing a desired engine load (e.g., torque) by applying model based techniques.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Engines (e.g., internal combustion engines such as reciprocating engines or gas turbines) combust a mixture of fuel and air to generate combustions gases that apply a driving force to a component of the engine (e.g., to move a piston or drive a turbine). To achieve a desired engine load, such as torque output, engines may use a throttle to regulate the amount of air and fuel entering the engine. Typically, the position of the throttle may be calculated given the desired torque and engine speed based on known throttle positions that result in the desired torque that produces the desired engine speed. However, determining the throttle position in such a way does not take into account various factors and may result in a slow throttle control response.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, an engine system may include an engine control system configured to receive a first pressure signal transmitted from a first pressure sensor disposed downstream from a throttle valve, receive a first temperature signal transmitted from a first temperature sensor disposed downstream from the throttle valve, derive a first pressure representative of the first pressure signal, derive a first temperature representative of the first temperature signal, derive a desired air-fuel mixture flow through the throttle valve, derive a first throttle position using a model, wherein the model is configured to use the desired air-fuel mixture flow, the first pressure, and the first temperature as model input, derive a second throttle position using a map, compare the first throttle position to the second throttle position, and apply the first throttle position to control the throttle valve when the first throttle position and the second throttle position are within one or more calibrated thresholds.

In one embodiment, a method may include receiving, via a processor, a first pressure signal transmitted from a first pressure sensor disposed downstream from a throttle valve, receiving, via the processor, a first temperature signal transmitted from a first temperature sensor disposed downstream from the throttle valve, deriving, via the processor, a first pressure representative of the first pressure signal, deriving, via the processor, a first temperature representative of the first temperature signal, deriving, via the processor, a desired air-fuel mixture flow through the throttle valve, deriving, via the processor, a first throttle position using a model, wherein the model is configured to use the desired air-fuel mixture flow, the first pressure, and the first temperature as model input, deriving, via the processor, a second throttle position using a map, comparing, via the processor, the first throttle position to the second throttle position, and applying the first throttle position to control the throttle valve when the first throttle position and the second throttle position are within one or more calibrated thresholds.

In one embodiment, a tangible, non-transitory, computer-readable medium may include instructions encoded thereon. The instructions, when executed by a processor, may be configured to receive a first pressure signal transmitted from a first pressure sensor disposed downstream from a throttle valve, receive a first temperature signal transmitted from a first temperature sensor disposed downstream from the throttle valve, derive a first pressure representative of the first pressure signal, derive a first temperature representative of the first temperature signal, derive a desired air-fuel mixture flow through the throttle valve, derive a first throttle position using a model, wherein the model is configured to use the desired air-fuel mixture flow, the first pressure, and the first temperature as model input, derive a second throttle position using a map, compare the first throttle position to the second throttle position, and apply the first throttle position to control the throttle valve when the first throttle position and the second throttle position are within one or more calibrated thresholds.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods for more accurately controlling a throttle position in an engine to generate a desired torque. It should be noted that throttle position may refer to the angle of a throttle plate inside a throttle body, or an amount of throttle throw or throttle travel. The techniques may derive the throttle position with one or more models of a throttle that account for numerous factors, such as boost to intake manifold pressure ratio, intake manifold pressure, intake air temperature, air fuel ratio, fuel quality (fuel heating value), engine operation efficiency, and so forth. In some embodiments, the factors may be obtained via one or more sensors, input from a user, automatically derived, or obtained by any other techniques. The techniques described herein may more reliably provide for throttle control, even in situations where sensors experience undesired maintenance conditions.

For example, a two dimensional (2D) map based throttle position derivation may be used to monitor the model based throttle derivation. The 2D map based throttle position derivation may be more robust than the model based throttle position derivation because the 2D map may not use as much (or any) sensor data, but the 2D map may derive a less accurate throttle position than the model. Accordingly, the 2D map based throttle position derivation may be used to crosscheck the throttle position derived using the model. That is, the 2D map based throttle position derivation and the model based throttle position derivation may be compared continuously, periodically, or at any desirable rate. If the derivations are within certain calibrated thresholds, then the model based throttle derivation may be used to control the engine load (e.g., engine torque). If the derivations deviate by more than the calibrated thresholds, for longer than a calibrated time period, or some combination thereof, then a throttle monitor fault may be set and one or more fault response procedures may be triggered to handle the fault. In some embodiments, the one or more fault response procedures may include using the smaller value between the map based and the model based throttle position derivations, shutting down the engine when the fault lasts more than a calibrated time period and/or when the map based and model based throttle position derivations deviate more than the calibrated threshold amount, sending an alert to a workstation, sounding an alarm, or some combination thereof.

Benefits of the disclosed techniques may include providing a more accurate derivation of throttle position for a desired torque by using sensor data included in a physical model of the throttle than using a map based throttle derivation alone. Also, the model based throttle position derivation may provide faster control response, higher sensitivity during turbocharger initiation, and more consistent engine performance when operational and environmental conditions change. However, as may be appreciated, in some instances, if any of the sensors providing data to the model are unresponsive, or several sensors have drifts but are still within their operating range, then the model based throttle position derivation may be undesirably affected. Thus, a robust map based throttle position derivation may be used to crosscheck and verify that the model based throttle position derivation is reasonable. In this way, the techniques may leverage the better control from the model based throttle position derivation and still maintain the robustness of the map based throttle position derivation.

Figure 1:
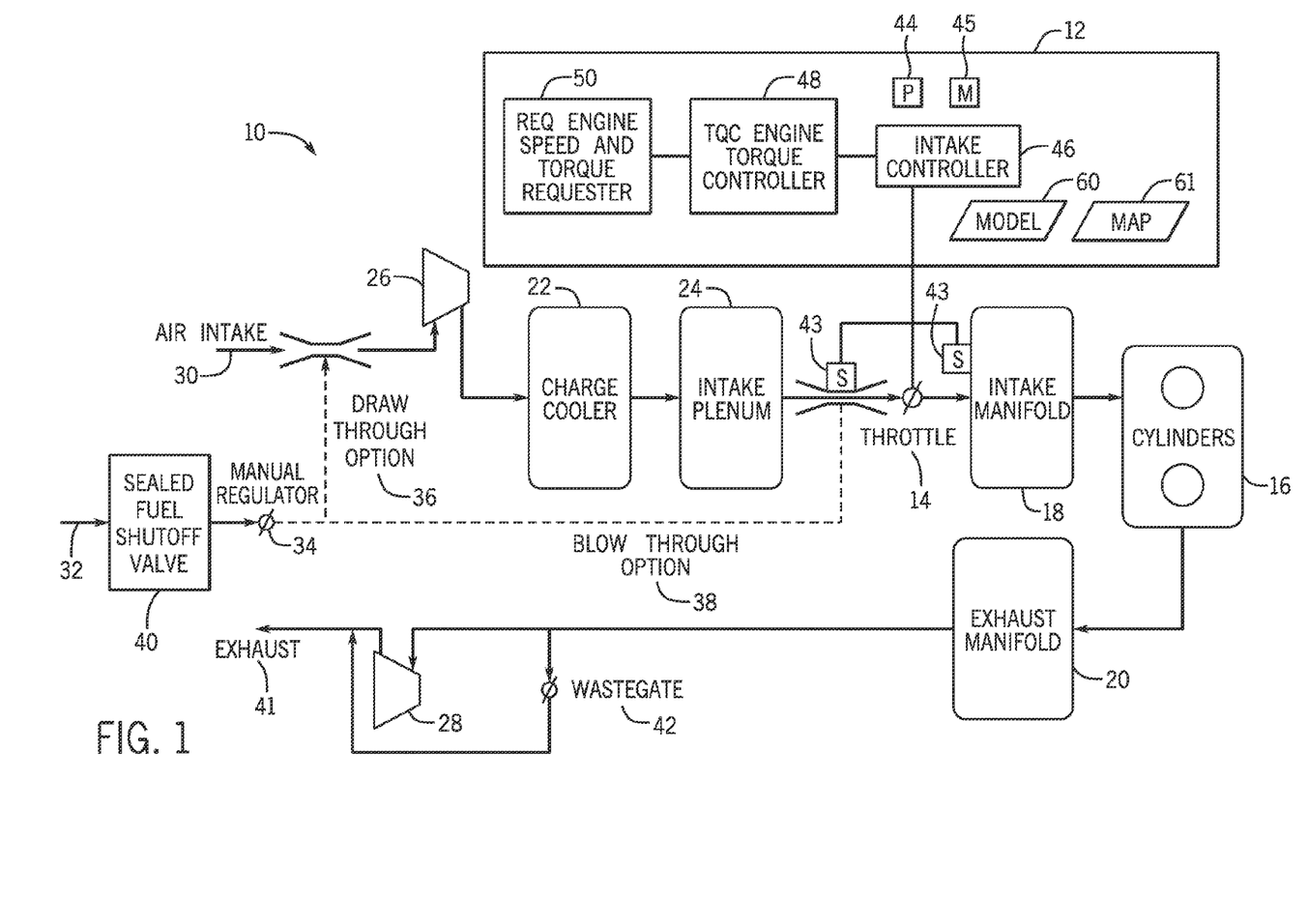
FIG. 1 illustrates a schematic diagram of an engine including a control system controlling a throttle position via model and map based control, in accordance with an embodiment.

Turning now to the drawings and referring to FIG. 1, a schematic diagram of an embodiment of an engine 10 including a control system 12 controlling a throttle 14 position is illustrated. The engine 10 may include a reciprocating or turbine engine (e.g., internal combustion engine). The engine 10 may include a spark-ignition engine or a compression-ignition engine. The engine 10 may include a natural gas engine, gasoline engine, diesel engine, or dual fuel engine. The engine 10 may be a two-stroke engine, three-stroke engine, four-stroke engine, five-stroke engine, or six-stroke engine. The engine 10 may also include any number of cylinders 16 (e.g., 1-24 cylinders or any other number of cylinders) and associated piston and liners. The engine 10 may be used in a vehicle, such as a locomotive, an automobile, a bus, or a boat. Alternatively, the engine 10 may be used in a stationary system coupled to an electrical generator.

The engine 10 may include an intake manifold 18 and an exhaust manifold 20. In some embodiments, the engine 10 may also include a charge cooler 22 (e.g., a heat exchanger) and an intake plenum 24. The illustrated charge cooler 22 includes a fluid connection to a compressor 26. The engine 10 may also include a turbocharger 28 driven by exhaust gas. The compressor 26 compresses an oxidant (e.g., intake air) 30 for intake into the intake manifold 18 after cooling by the charge cooler 22 and pressurization in the intake plenum 24. Fuel 32 may be injected and combined with the air 30 by opening a manual regulator 34. The manual regulator 34 may regulate the amount and flow of the fuel 32 entering the engine 10. In some embodiments, the engine 10 may include two options for adding fuel 32 to the air 30. The first may include a draw through option 36 and the second may include a blow through option 38. Using the draw through option 36 the fuel 32 and air 30 may be mixed prior to compression, cooling, and pressurization before being sent to the intake manifold 18, and using the blow through option 38 the fuel 32 may be mixed with the air 30 right before entering the intake manifold 18. A sealed fuel shutoff valve 40 may terminate the flow of fuel 32 into the engine 10 when closed as desired.

The air-fuel mixture is allowed to flow through the throttle 14 based on the throttle 14 position set by the control system 12 according to the amount of torque desired to maintain a certain speed of the engine 10. The air-fuel mixture flows through the throttle 14 at the desired flow rate and into the intake manifold 18, which evenly distributes the air-fuel mixture to the cylinders 16. Once in the cylinders 16, the air-fuel mixture combusts to generate hot combustion gases, which flow downstream through the exhaust manifold 20 into a turbocharger 28. For example, the combustion gases move through the turbocharger 28 to drive the turbocharger 28 to rotate, which in turn may increase engine 10 efficiency and power by driving extra air into, for example, a compressor 26. The compressor 26 may compress the intake air charge to produce boost. After passing through the turbocharger 28, the hot combustion gases may vent as exhaust gases 41. Also, as depicted, the engine may include a wastegate 42 valve that diverts exhaust gases away from the turbocharger 28 to regulate the turbocharger 28 speed.

The control system 12 may be connected to one or more sensors 43 and devices throughout the engine 10. For example, the illustrated control system 12 is coupled at least to the throttle 14 and the sensors 43 that are upstream and downstream of the throttle 14. That is, the sensors 43 may be located proximate to the entrance and exit of the throttle 14 (e.g., in between the intake plenum 24 and the throttle 14 and in between the throttle 14 and the intake manifold 18). The sensors 43 may include atmospheric and engine sensors, such as pressure sensors, temperature sensors, speed sensors, and so forth. For example, the sensors 43 may include knock sensors, $NO_X$ sensors, oxygen or lambda sensors, engine air intake temperature sensors, engine air intake pressure sensors, jacket water temperature sensors, engine exhaust temperature sensors, engine exhaust pressure sensors, and so forth. Other sensors 43 may also include compressor 26 inlet and outlet sensors 43 for temperature and pressure. It should be understood that the arrangement of the sensors 43 enable providing signals to the control system 12 indicative of pressure and temperature upstream and downstream from the throttle 14.

In some embodiments, the control system 12 may include one or more processors 44 and one or more tangible, non-transitory computer-readable media (memories 45) that store computer instructions that perform the disclosed techniques. Also, the control system 12 may include various modules that perform specific functionality, such as an intake controller 46, an engine torque controller (TQC) 48, an engine speed and torque requester (REQ) 50, and so forth. The intake controller 46 may provide functionality to derive a throttle position using fluid dynamic models 60 (e.g., physics based models) of a throttle 14 based on pressure and/or temperature data obtained by the sensors 43 and a desired total flow of the air-fuel mixture through the throttle 14. The model 60 used to derive the throttle position may accept inputs from the TQC 48, such as a desired torque, which may be derived upon receiving an engine speed and torque request from the REQ 50. In addition, the model may accept other inputs, including a fuel heating value, a fuel conversion efficiency, and the like. Further, the intake controller 46 may also provide functionality to derive a throttle position using a two dimensional (2D) map 61, as previously discussed. The 2D map 61 may accept a desired engine speed and torque as inputs and output the associated throttle position. In some embodiments, the 2D map 61 may include a lookup table that outputs a throttle position given the desired torque and engine speed.

As discussed in detail below, the intake controller 46 may monitor the throttle position derivation obtained using the model 60 by comparing it to the map 61 based throttle position derivation. If the model 60 based and map 61 based throttle position derivations match within a threshold amount (e.g., any suitable percentage, such as 1%, 2%, 5%, 10%, etc.), then the model 60 based throttle position derivation may be applied to the throttle 14 to produce the desired torque. Specifically, the throttle plate may be set to the determined angle (position) in the throttle body to enable the desired flow of the air-fuel mixture to pass through the throttle 14 to the intake manifold 18 and the cylinders 16 where the air-fuel mixture combusts. The threshold may be calibrated during testing of the throttle 14 during the quality assurance phase of manufacturing, obtained via an external source (e.g., sent from the manufacturer), and/or upon the first start of the engine 10. If the model 60 based and map 61 based throttle position derivations are not within the calibrated threshold, deviate for a calibrated amount of time, or some combination thereof, then the control system 12 may set a fault and one or more fault response procedures may be triggered. By combining model 60 based and map 61 based control, the techniques described herein may provide for enhanced reliability and control accuracy.

Figure 2:
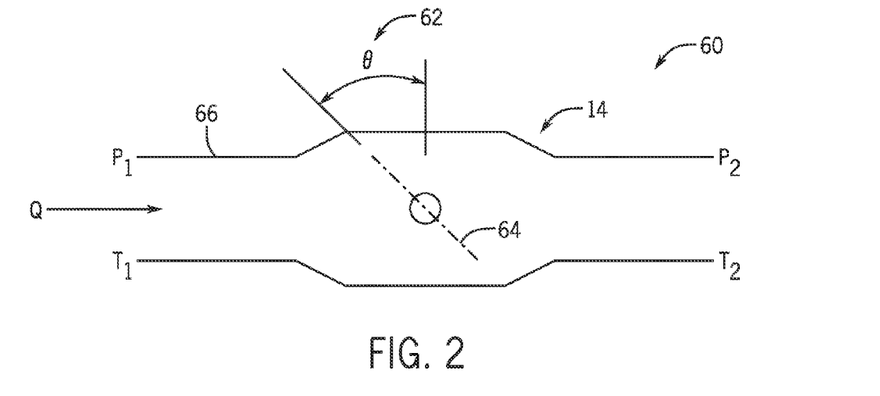
FIG. 2 illustrates a schematic diagram of a model of a throttle and connections immediately upstream and downstream of the throttle, in accordance with an embodiment.

FIG. 2 illustrates a schematic diagram of the model 60 of a throttle system having the throttle 14 (e.g., throttle valve 14) and connections immediately upstream and downstream of the throttle 14, in accordance with an embodiment. As previously discussed, the model 60 may be a physical (e.g., fluid dynamic) model of the throttle 14. The model 60 may enable the execution of simulations useful in determining what the position (angle) 62 of a throttle plate 64 should be to allow a desired flow of the air-fuel mixture to pass through the throttle 14. The model 60 may simulate the interaction of the air-fuel mixture with surfaces of the throttle 14, such as the throttle body 66 and the throttle plate 64, and various upstream and downstream pressures and temperatures. Further, the model 60 may account for various factors including the air-fuel ratio, heating value of the fuel, and/or engine operation efficiency.

As illustrated, the model 60 may include inputs for pressure upstream of the throttle 14 (P1), pressure downstream of the throttle 14 at the intake manifold 18 (P2), temperature upstream of the throttle 14 (T1), temperature downstream of the throttle 14 at the intake manifold 18 (T2), and total flow (Q) of air-fuel mixture through the throttle 14. The model 60 may output a desired throttle position 62 ($\Theta$) after running a simulation with the inputs to achieve the desired total flow Q through the throttle 14.

The upstream and downstream pressures (P1 and P2) and temperatures (T1 and T2) may be obtained from data received from the sensors 43. Using the sensor 43 data, the model 60 may adjust the throttle position 62 ($\Theta$) based on the upstream and downstream pressures (P1 and P2) and temperatures (T1 and T2). For example, if the upstream pressure P1 is high, the throttle position 62 ($\Theta$) may be opened to a larger degree. However, if the intake pressure P1 is low, then the model 60 may derive that the throttle position 62 ($\Theta$) may be opened to a lesser degree. Further, the model 60 may account for degradation of certain parts in the engine 10. For example, if fuel actuators are becoming slower, then the pressures P1 and/or P2 may not build up and the sensors 43 may detect the decline in pressures P1 and/or P2 and the model 60 may adjust the throttle position 62 ($\Theta$) accordingly. In this way, the model 60 may account for operational conditions and environmental conditions as they change to provide a more accurate throttle position 62 ($\Theta$) when running simulations.

The desired total flow Q may be derived from inputs related to a desired amount of fuel, a desired amount of air, and a desired amount of exhaust gas recirculation (EGR) needed to produce the desired torque. The amount of fuel may be derived by the model 60 using a fuel heating value and the torque that was input by the TQC 50. The fuel heating value relates to the energy in the fuel. Based on the torque and the fuel heating value, the model 60 may derive the amount of fuel. For example, if the fuel heating value is high, then more fuel may be needed to continue to produce the desired torque because the fuel may burn faster, or vice versa. In some embodiments, the fuel heating value may be entered by a user on a human-machine interface (HMI) and/or may be automatically derived using the model 60.

Then, using the amount of fuel needed and the fuel heating value, the amount of air needed may be derived. For example, to meet certain regulatory emissions requirements, the air-fuel ratio (AFR) may need to be a certain amount (e.g., 40/60, 50/50, 60/40, etc.). Thus, based on the amount of fuel needed, the intake controller 46 may determine the amount of air needed to meet the air-fuel ratio to satisfy the emissions requirements. Therefore, as may be appreciated, the air-fuel ratio depends on the fuel heating value. Further, an amount of EGR may be used in addition to the amount of air and fuel to account for the expected gas exhaust and recirculation of the exhaust back into the intake system. Using the amount of fuel, amount of air, and amount of EGR, the model 60 may derive the total flow Q to use when deriving the throttle position 62 (⊖).

Figure 3:
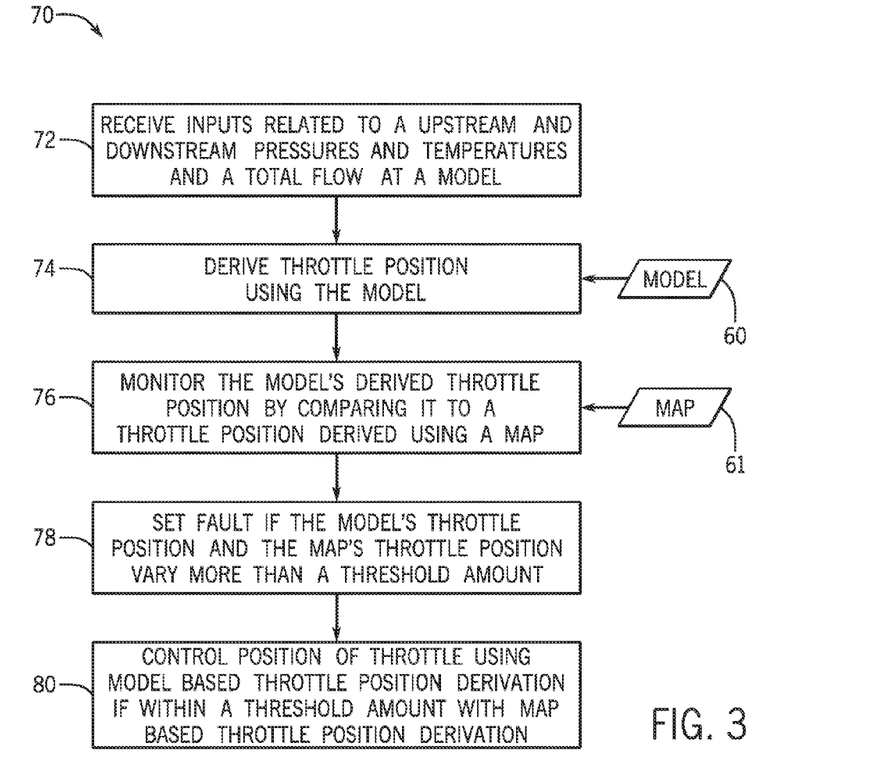
FIG. 3 illustrates a flow diagram of a process suitable for deriving a model based throttle position and monitoring the model based throttle position derivation with a derived map based throttle position, in accordance with an embodiment.

FIG. 3 illustrates a flow diagram of a process 70 suitable for deriving a model based throttle position 62 (⊖) and monitoring the model based throttle position 62 (⊖) derivation with the derived map 61 based throttle position, in accordance with an embodiment. The process 70 may be implemented as computer instructions stored on the memory 45 and executable by the processor 44. The process 70 may include receiving inputs related to upstream and downstream pressures (P1 and P2) and temperatures (T1 and T2) and a total flow of air-fuel mixture Q (process block 72). The process 70 may then derive the throttle position 62 (⊖) (process block 74), and monitor the model's derived throttle position 62 (⊖) by comparing it to a throttle position derived using the map 61 (process block 76). The process 70 may then raise a fault if the model's derived throttle position 62 (⊖) and the map's 61 derived throttle position vary by more than a calibrated threshold amount, a threshold calibrated amount of time, or some combination thereof (process block 78). The process 70 may control the position of the throttle 14 using the model based throttle position 62 (⊖) derivation if it is within a threshold amount with the map based throttle position derivation (process block 80). That is, the process 70 may first use model-based control, and then compare the position derived via model 60 based control with a map 61 based value to improve reliability.

Starting with process block 72, the model 60 may receive the upstream and downstream pressures (P1 and P2) and temperatures (T1 and T2) from sensor 43 data and the total flow Q may be derived based on various factors. More specifically, the total flow Q may be derived based on the amount of fuel, amount of air, and/or amount of EGR needed to produce the desired torque. As described in more detail below, the amount of fuel may be determined based on a fuel heating value and a desired torque that is input from the TQC 48. The amount of air needed to combust may be derived based on the amount of fuel needed and an air-fuel ratio (AFR), which may be set based on emission requirements. The model 60 may accept the inputs and derive the throttle position 62 (⊖) to apply to the throttle 14 to enable the total flow Q through the throttle 14 (process block 74).

In process block 76, the process 70 may include monitoring the model based throttle position 62 (⊖) derivation by comparing it to the throttle position derived using the 2D map 61 (e.g., lookup table). The 2D map 61 may provide the throttle position given a torque sent by the TQC 48 and a desired engine speed, as previously discussed. If a deviation between the model 60 based and map based throttle position derivation becomes larger than a calibrated threshold, or would be applied for longer than a calibrated threshold amount of time, or both, then a fault may be set (process block 78). The fault being set may trigger one or more fault response procedures.

The fault response procedures may include using the smaller value for the throttle position between the map 61 based and model 60 based throttle position 62 (⊖) derivations, shutting down the engine when the deviation is larger than the calibrated threshold amount and/or the deviation lasts longer than the calibrated amount of time, sending an alert to a workstation, reporting the deviation to the manufacturer to determine if there are situations or locations where throttles do not act as expected (remote monitoring), sounding an alarm, or some combination thereof. As previously discussed, the thresholds may be established during testing of the engine 10. In some embodiments, the thresholds may be calibrated with a sufficient margin so as not to trigger too many faults due to oversensitivity.

If the model 60 based and map 61 based throttle position derivations are within the calibrated threshold to each other, the model 60 based throttle position 62 (⊖) derivation may be used to control the engine 10 load (engine 10 torque) (process block 80). In this way, the techniques leverage the more accurate control of the model 60 based throttle position 62 (⊖) derivation while at the same time leverage the robustness of the map 61 based throttle position derivation to crosscheck the results of the model 60 to ensure that a reasonable throttle position 62 (⊖) is being derived before applying the derived throttle position 62 (⊖) to the throttle 14. This may inhibit the model 60 from deriving a throttle position 62 (⊖) that could lead to undesirable maintenance conditions of the engine 10 if the sensors 43 are faulty and providing inaccurate data to the model 60.

Figure 4A:
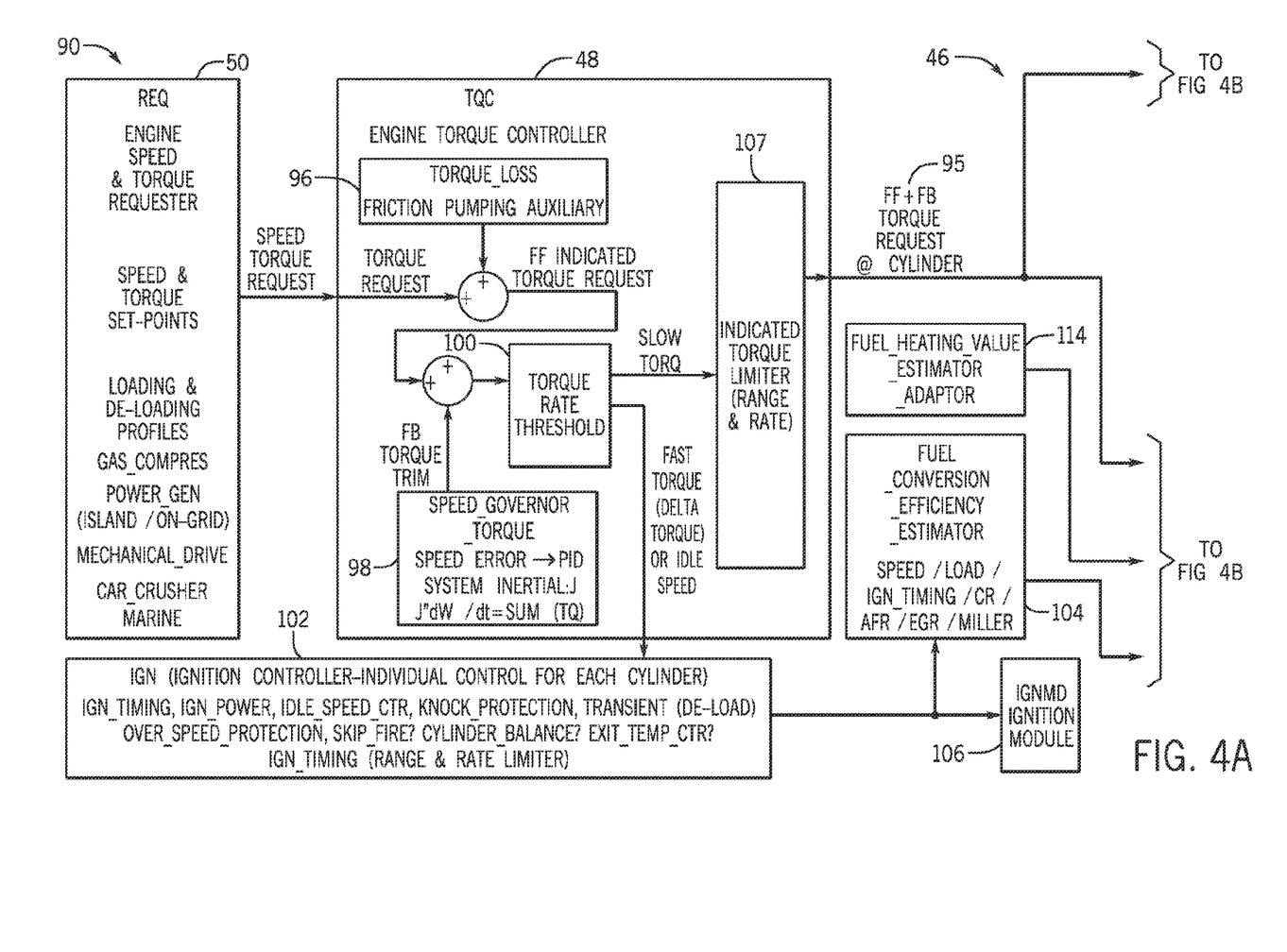
FIGS. 4A and 4B illustrate a schematic diagram of a system using model based and map based throttle position derivation and monitoring to control engine load, in accordance with an embodiment.
Figure 4B:
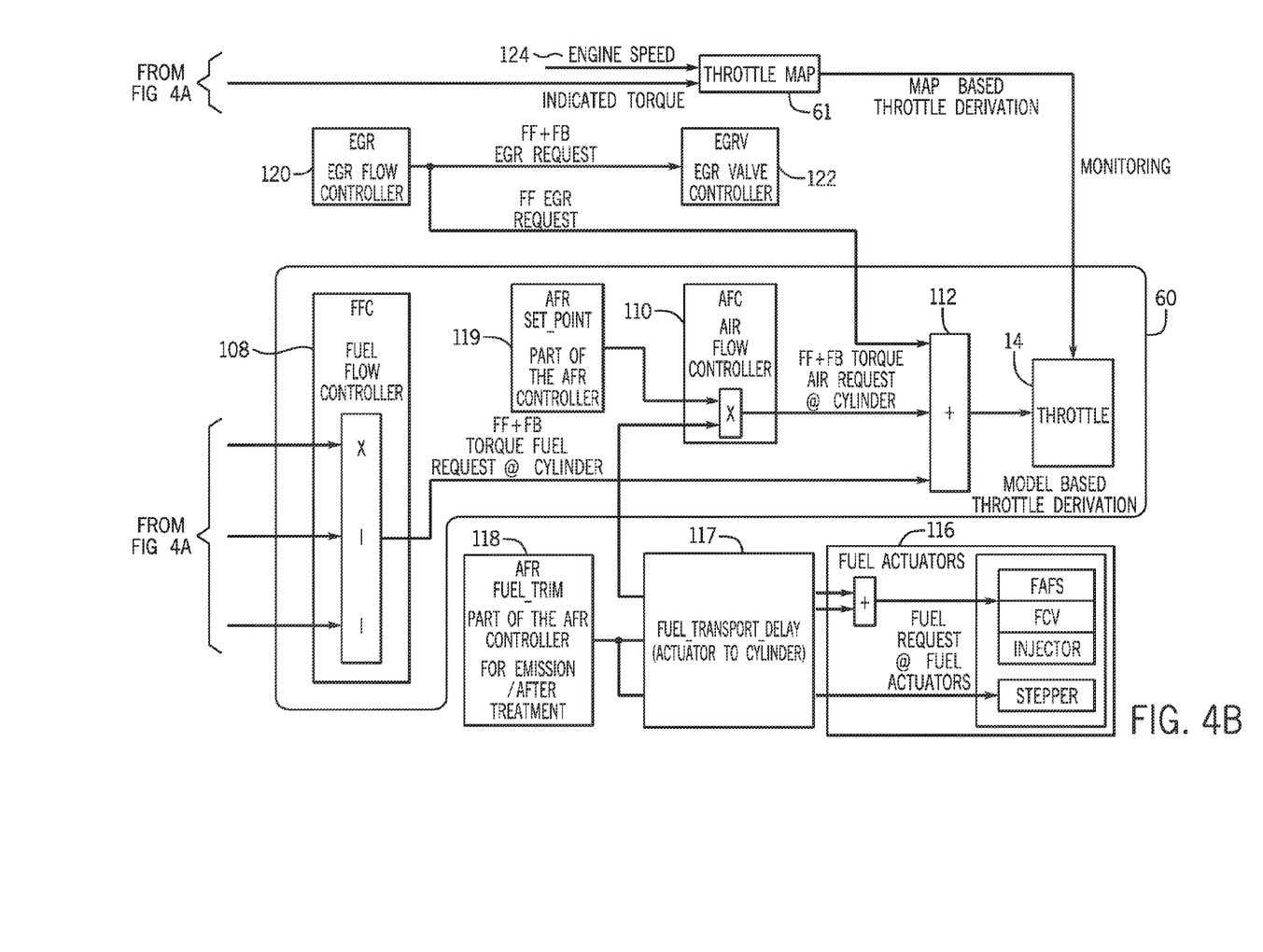

FIGS. 4A and 4B illustrate a schematic diagram of a control system 90 using model 60 based and map 61 based throttle position derivation and monitoring to control engine 10 load, in accordance with an embodiment. The system 90 may include the engine speed and torque requester (REQ) 50, the engine torque controller (TQC) 48, and the intake controller 46, which may apply the map 61 based throttle position derivation and a model 60 based throttle position derivation to control the engine system 10. The REQ 50 may include engine 10 speed and torque set-points. For example, for a desired engine 10 speed, the REQ 50 may provide the respective torque set-point to generate the desired engine 10 speed. In addition the REQ 50 may include loading and de-loading profiles for certain types of loads and engines 10. It should be noted that the system 90 does not need to know anything about the driven application (load). Indeed, the load may be swapped out and the system 90 may account for the switch without knowing exactly which type of load is being driven. That is, using the system 90, the derived throttle 14 position may be made independently without knowledge of the particular application being driven.

The REQ 50 may provide an engine 10 speed and torque request to the TQC 48. The TQC 48 may receive the torque request and output a torque command 95, which is used by the model 60 based throttle position derivation and the map 61 based throttle position derivation. In some embodiments, the TQC 48 may use a torque loss component 96 to account for friction and the like. The torque request may be adjusted by a speed and torque governor component 98. Further, the TQC 48 may determine whether the trimmed torque request passes a torque rate threshold 100. Fast torques or idle speed may be sent to an ignition controller 102 that is coupled with a fuel conversion efficiency estimator 104 and an ignition module 106. Slow torques may pass through an indicated torque limiter 107 and be output as the torque command 95.

As illustrated, the model based throttle position derivation may include derivations calculated by applying the model 60, such as derivations obtained from various components, which may include a fuel flow controller (FFC) 108 component, an air flow controller (AFC) 110 component, and a total flow Q controller 112 component, to derive the throttle position 62 (⊖). The FFC 108 may accept at least three inputs: the torque command 95 from the TQC 48 for each cylinder, a fuel heating value 114 entered by a user and/or derived automatically, and fuel conversion efficiency estimation 104.

The FFC 108 may use the torque command 95, fuel heating value 114, and the fuel conversion efficiency estimation 104 to derive an amount of fuel that may be needed during combustion in each cylinder to produce the desired torque. The FFC 108 may output the torque and the derived amount of fuel needed at each cylinder to the AFC 110, the total flow Q controller 112, and fuel actuators 116. The fuel actuators 116 may inject the fuel into the engine 10 as requested. It should be noted that the control system 90 may take into account a fuel transport delay 117 between the actuators 116 to the cylinders. Further, the control system 90 may include an air-fuel ratio (AFR) fuel trim component 118 that may reduce the amount and/or flow of fuel injected into the engine 10 based on certain emission requirements.

Using the amount of fuel requested and desired torque, the AFC 110 may derive the amount of air needed in the cylinders for proper combustion based on an air-fuel ratio (AFR) set point 119. For example, if the AFR set point 119 is 50%, then the AFC 110 may determine that the air-fuel mixture has to include 50% fuel and 50% air. Thus, in this example, the same amount of air must be used as the requested amount of fuel to achieve the AFR set point 119. In some embodiments, the AFR set point 119 may be set according to regulatory emissions requirements. The AFC 110 may output the amount of air at each cylinder and desired torque to the total flow Q controller 112.

Also, in some embodiments, the total flow Q controller 112 may accept input from an EGR flow controller 120. The EGR flow controller 120 may account for the expected gas exhaust and derive the amount of EGR to pass back through the intake system. The EGR flow controller 120 may send an EGR request to an EGR valve controller 122 to control the amount of EGR as determined.

Using the amount of fuel requested from the FFC 108, amount of air requested from the AFC 110, and/or the amount of EGR requested from the EGR flow controller 120, the total flow Q controller 112 may derive the desired total flow Q to pass through the throttle 14. The model 60 may use the total flow Q, along with upstream and downstream pressures (P1 and P2) and temperatures (T1 and T2) to derive the throttle position 62 (Θ) by running simulations to determine which position enables the desired total flow Q to more optimally traverse a physical (fluid dynamic) model 60 of the throttle 14.

As illustrated, the map 61 based throttle position derivation may be used to monitor the model 60 based throttle position derivation. The map 61 may receive the torque command 95 from the TQC 48 as well as a desired engine speed 124 as inputs and may derive the associated throttle position. As previously discussed, the map 61 may not use sensor data to derive the throttle position and may include a look-up table with associated torques, engine speeds, and throttle positions. The map 61 may be two dimensional (2D) because it accepts two inputs: torque 95 and engine speed 124. The system 90 may continuously, periodically, or some combination thereof, compare the map 61 based throttle position derivation with the model 60 based throttle 14 position derivation to check whether the derivations are within calibrated thresholds of each other. If the derivations are not within the calibrated thresholds, the system 90 may perform one or more fault response procedures as discussed above.

Technical effects of the disclosure include deriving a more accurate throttle 14 position using a model 60 based approach and crosschecking the accuracy of the model 60 using a throttle position derived using a 2D map 61. The model 60 of the throttle 14 may account for various factors, such as upstream and downstream pressures (P1 and P2) and temperatures (T1 and T2), fuel heating values 114, engine operation efficiency (fuel conversion efficiency 104), and so forth. The data related to the pressures (P1 and P2) and temperatures (T1 and T2) may be obtained via one or more sensors 43 and, thus, enables the model 60 to adjust for environmental and operational conditions as they change. By using the map 61 based throttle 14 position derivation, the techniques are able to crosscheck the model 60 based throttle 14 position derivation and set faults when certain calibrated thresholds are not met. In this way, the techniques leverage the better control obtained from the model 60 based throttle 14 position derivation while still maintaining the robustness of the map 61 based throttle 14 position derivation.

This written description uses examples to disclose the present techniques, including the best mode, and also to enable any person skilled in the art to practice the techniques, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An engine system, comprising:
   an engine control system configured to:
   receive a first pressure signal transmitted from a first pressure sensor disposed downstream from a throttle valve;
   receive a first temperature signal transmitted from a first temperature sensor disposed downstream from the throttle valve;
   derive a first pressure representative of the first pressure signal;
   derive a first temperature representative of the first temperature signal;
   derive a desired air-fuel mixture flow through the throttle valve;
   derive a first throttle position using a model, wherein the model is configured to use the desired air-fuel mixture flow, the first pressure, and the first temperature as model input;
   derive a second throttle position using a map;
   compare the first throttle position to the second throttle position; and
   apply the first throttle position to control the throttle valve when the first throttle position and the second throttle position are within one or more calibrated thresholds.

2. The engine system of claim 1, wherein the engine control system comprises an engine control unit (ECU), and wherein the ECU is configured to:
   receive a second pressure signal transmitted from a second pressure sensor disposed upstream from the throttle valve;
   receive a second temperature signal transmitted from a second temperature sensor disposed upstream from the throttle valve;
   derive a second pressure representative of the second pressure signal; and derive a second temperature representative of the second temperature signal, wherein the model is configured to use the first and the second pressure and the first and the second temperature as model input to derive the first throttle position.

3. The engine system of claim 1, wherein the model comprises a fluid dynamic model of a throttle system having the throttle valve.

4. The engine system of claim 1, wherein the map comprises a lookup table that maps a desired engine torque and an engine speed to the second throttle position.

5. The engine system of claim 1, wherein the engine control system is configured to derive the desired air-fuel mixture flow based on a desired fuel amount, a desired air amount, and a desired exhaust gas recirculation amount.

6. The engine system of claim 5, wherein the engine control system is configured to derive the desired fuel amount based on a desired engine torque, a fuel heating value, a fuel conversion efficiency, or some combination thereof.

7. The engine system of claim 6, wherein the fuel heating value is provided by a user or automatically derived via a sampling of a fuel.

8. The engine system of claim 1, wherein the one or more calibrated thresholds comprise a threshold difference between the first and the second throttle position, a threshold amount of time that the first and the second throttle position deviate, or a combination thereof.

9. The engine system of claim 8, wherein the engine control system is configured to apply the smaller of the first throttle position or the second throttle position if the first and the second throttle positions are not within the one or more calibrated thresholds.

10. The engine system of claim 5, wherein the engine control system is configured to derive the desired air amount based on an air-fuel ratio and the desired fuel amount, and wherein the engine control system is configured to actuate an actuator to provide the desired air amount.

11. The engine system of claim 1, wherein the engine control system is configured to report a deviation between the first and the second throttle positions, shut down an engine having the throttle valve, raising an alert or an alarm, or a combination thereof, if the first and the second throttle positions are not within the one or more calibrated thresholds.

12. A method, comprising:
receiving, via a processor, a first pressure signal transmitted from a first pressure sensor disposed downstream from a throttle valve;
receiving, via the processor, a first temperature signal transmitted from a first temperature sensor disposed downstream from the throttle valve;
deriving, via the processor, a first pressure representative of the first pressure signal;
deriving, via the processor, a first temperature representative of the first temperature signal;
deriving, via the processor, a desired air-fuel mixture flow through the throttle valve;
deriving, via the processor, a first throttle position using a model, wherein the model is configured to use the desired air-fuel mixture flow, the first pressure, and the first temperature as model input;
deriving, via the processor, a second throttle position using a map;
comparing, via the processor, the first throttle position to the second throttle position; and
applying, via the processor, the first throttle position to control the throttle valve when the first throttle position and the second throttle position are within one or more calibrated thresholds.

13. The method of claim 12, comprising:
receiving, via the processor, a second pressure signal transmitted from a second pressure sensor disposed upstream from the throttle valve;
receiving, via the processor, a second temperature signal transmitted from a second temperature sensor disposed upstream from the throttle valve;
deriving, via the processor, a second pressure representative of the second pressure signal; and
deriving, via the processor, a second temperature representative of the second temperature signal, wherein the model is configured to use the first and the second pressure and the first and the second temperature as model input to derive the first throttle position.

14. The method of claim 12, wherein the model comprises a fluid dynamic model of a throttle system having the throttle valve.

15. The method of claim 12, comprising:
deriving the desired air-fuel mixture flow based on a desired fuel amount, a desired air amount, and a desired exhaust gas recirculation amount.

16. The method of claim 15, comprising:
deriving the desired fuel amount based on a desired engine torque, a fuel heating value, a fuel conversion efficiency, or some combination thereof.

17. The method of claim 12, comprising: reporting a deviation between the first and the second throttle positions, shutting down an engine having the throttle valve, raising an alert or an alarm, or a combination thereof, if the first and the second throttle positions are not within the one or more calibrated thresholds.

18. A tangible, non-transitory, computer-readable medium comprising instructions encoded thereon, wherein the instructions, when executed by a processor, are configured to:
receive a first pressure signal transmitted from a first pressure sensor disposed downstream from a throttle valve;
receive a first temperature signal transmitted from a first temperature sensor disposed downstream from the throttle valve;
derive a first pressure representative of the first pressure signal;
derive a first temperature representative of the first temperature signal;
derive a desired air-fuel mixture flow through the throttle valve;
derive a first throttle position using a model, wherein the model is configured to use the desired air-fuel mixture flow, the first pressure, and the first temperature as model input;
derive a second throttle position using a map;
compare the first throttle position to the second throttle position; and
apply the first throttle position to control the throttle valve when the first throttle position and the second throttle position are within one or more calibrated thresholds.

19. The computer-readable medium of claim 18, wherein the one or more calibrated thresholds comprise a threshold amount difference between the first and the second throttle position, a threshold amount of time that the first and the second throttle position differ, or some combination thereof, and are set during testing of the engine.

20. The computer-readable medium of claim 18, wherein the model is a fluid dynamic physical model of the throttle that simulates interaction of the air-fuel mixture with surfaces of the throttle and pressures and temperatures upstream and downstream from the throttle to derive the first throttle position.

* * * * *